United States Patent
Ryu et al.

(10) Patent No.: US 9,576,706 B2
(45) Date of Patent: *Feb. 21, 2017

(54) METHOD FOR PREPARING CARBON NANO MATERIAL/POLYMER COMPOSITES

(71) Applicants: Sang Hyo Ryu, Daejeon (KR); Kwon Ju, Daejeon (KR); Nam Sun Choi, Daejeon (KR); Sang Kyu Choi, Daejeon (KR); Myung Wook Jung, Daejeon (KR); Yu Hyun Song, Daejeon (KR); Young Chan Jang, Daejeon (KR)

(72) Inventors: Sang Hyo Ryu, Daejeon (KR); Kwon Ju, Daejeon (KR); Nam Sun Choi, Daejeon (KR); Sang Kyu Choi, Daejeon (KR); Myung Wook Jung, Daejeon (KR); Yu Hyun Song, Daejeon (KR); Young Chan Jang, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 308 days.

This patent is subject to a terminal disclaimer.

(21) Appl. No.: 13/724,749

(22) Filed: Dec. 21, 2012

(65) Prior Publication Data
US 2013/0207052 A1  Aug. 15, 2013

(30) Foreign Application Priority Data
Feb. 13, 2012  (KR) .................. 10-2012-0014515

(51) Int. Cl.
*H01B 13/00* (2006.01)
*H01B 1/04* (2006.01)
(Continued)

(52) U.S. Cl.
CPC ............. *H01B 13/00* (2013.01); *H01B 1/04* (2013.01); *H01B 1/24* (2013.01); *B82Y 30/00* (2013.01); *B82Y 40/00* (2013.01); *Y10S 977/742* (2013.01)

(58) Field of Classification Search
None
See application file for complete search history.

(56) References Cited

U.S. PATENT DOCUMENTS 4,530,779 A * 7/1985 Mayama ............... H01B 1/22
                                             252/507
4,772,422 A * 9/1988 Hijikata ................ C08K 3/04
                                             252/503
(Continued)

FOREIGN PATENT DOCUMENTS

KR      10-0955295        4/2010
KR   10-2011-0065704      6/2011

OTHER PUBLICATIONS

Bralla, James G. ("Teflon" entry, (2007). Handbook of Manufacturing Processes—How Products, Components and Materials are Made. (pp. 765). Industrial Press. Attached to case file as a PDF. Online version available at: http://app.knovel.com/hotlink/toc/id:kpHMPHPCM1/handbook-manufacturing/handbook-manufacturing).*

(Continued)

*Primary Examiner* — Harold Pyon
*Assistant Examiner* — Katie L Hammer
(74) *Attorney, Agent, or Firm* — Hauptman Ham, LLP

(57) ABSTRACT

Disclosed is a method for preparing a carbon nanomaterial/polymer composite. More particularly, it relates to an improved method for preparing a carbon nanomaterial/polymer composite capable of solving a dust problem of a carbon nanomaterial powder and a layer separation problem due to large density difference between the carbon nanoma- (Continued)

terial powder and a polymer pellet and providing superior physical properties of the composite, whereby an additive used to prepare the carbon nanomaterial/polymer composite is mixed with the carbon nanomaterial powder and prepared into a pellet, which is then mixed with the polymer pellet.

7 Claims, 2 Drawing Sheets

(51) Int. Cl.
  *H01B 1/24* (2006.01)
  *B82Y 30/00* (2011.01)
  *B82Y 40/00* (2011.01)

(56) References Cited

U.S. PATENT DOCUMENTS

| | | | | |
|---|---|---|---|---|
| 4,806,586 | A * | 2/1989 | Nakai | C08K 3/34 523/212 |
| 5,594,060 | A * | 1/1997 | Alig | C08K 7/06 423/448 |
| 5,654,357 | A * | 8/1997 | Menashi | C09C 1/58 524/495 |
| 2002/0183438 | A1 * | 12/2002 | Amarasekera | H01B 1/24 524/495 |
| 2003/0181568 | A1 * | 9/2003 | Amarasekera et al. | 524/495 |
| 2004/0067153 | A1 * | 4/2004 | Koide | B22D 17/2061 419/8 |
| 2004/0084797 | A1 * | 5/2004 | Iizuka | C08L 77/00 264/104 |
| 2008/0191176 | A1 * | 8/2008 | Tobori et al. | 252/511 |
| 2009/0294736 | A1 * | 12/2009 | Burton | B82Y 30/00 252/511 |
| 2010/0201023 | A1 * | 8/2010 | Piccione et al. | 264/117 |
| 2011/0256454 | A1 * | 10/2011 | Nicolas et al. | 429/232 |
| 2012/0241686 | A1 * | 9/2012 | Bastiaens | C08J 3/22 252/511 |

OTHER PUBLICATIONS

"B20 Tableting Systems". (Center for Chemical Process Safety (2005). Guidelines for Safe Handling of Powders and Bulk Solids. (pp. 730-733). Center for Chemical Process Safety/AIChE. A copy is attached as a PDF. Online version available at: http://app.knovel.com/hotlink/toc/id:kpGSHPBS01/guidelines-safe-handling/guidelines-safe-handling).*
Copending U.S. Appl. No. 13/724,542 to Nyu et al.*

* cited by examiner

METHOD FOR PREPARING CARBON NANO MATERIAL/POLYMER COMPOSITES

CROSS-REFERENCE TO RELATED APPLICATIONS

This application claims priority under 35 U.S.C. §119 to Korean Patent Application No. 10-2012-0014515, filed on Feb. 13, 2012, in the Korean Intellectual Property Office, the disclosure of which is incorporated herein by reference in its entirety.

BACKGROUND (a) Technical Field

The present invention relates to a method for preparing a carbon nanomaterial/polymer composite. More particularly, it relates to an improved method for preparing a carbon nanomaterial/polymer composite capable of solving a dust problem of a carbon nanomaterial powder and a layer separation problem due to large density difference between the carbon nanomaterial powder and a polymer pellet and providing superior physical properties of the composite, whereby an additive used to prepare the carbon nanomaterial/polymer composite is mixed with the carbon nanomaterial powder and prepared into a pellet, which is then mixed with the polymer pellet.

(b) Background Art

Carbon nanomaterials include fullerene, carbon nanotube (CNT), graphene, graphite nanoplate, etc. Among them, a carbon nanotube has a cylindrical nanostructure with a honeycomb-shaped sheet of graphite rolled to a diameter of nanometer scale and has specific characteristics depending on shape. The carbon nanotube is light since it has a hollow space, has good electrical conductivity comparable to that of copper, has good thermal conductivity comparable to that of diamond and has good tensile strength comparable to that of steel. It is also categorized as single-walled carbon nanotube (SWCNT), multi-walled carbon nanotube (MWCNT) or rope carbon nanotube according to the rolling type.

Owing to its superior physical properties, the carbon nanotube is drawing attentions as filler of various polymer composites, including antistatic polymer composites, EMI-shielding polymer composites, heat-resistant polymer composites, high-strength polymer composite, and so forth. In particular, many researches and developments are underway for commercialization of polymer composites using the carbon nanotube.

However, despite the R&D efforts, the dust problem due to low apparent density of carbon nanotube powder and health issue arising therefrom, layer separation occurring when the carbon nanotube is supplied together with a polymer pellet to an extruder to prepare a polymer composite due to the large density difference of the carbon nanomaterial powder and the polymer pellet, and dispersion problem of the carbon nanotube as a result thereof remain obstacles to large-scale use of the carbon nanotube. Although an additive is commonly added to improve dispersibility of the carbon nanotube in the melted polymer, further studies are necessary to achieve better dispersion effect with the same amount of the additive.

Methods for preparing a carbon nanomaterial/polymer composite by adding an additive disclosed in the published patents include the followings.

World Tube Co., Ltd.'s Korean Patent No. 10-0955295 titled "Manufacturing method of shaped solid comprising nanocarbon" discloses a shaped solid comprising a nanocarbon, a metal (including oxide and ion) and a resin. However, since the prepared shaped solid comprises the metal and the resin, when it is used in a polymer composite, a polymer used as a matrix may react with or be incompatible with the metal and the resin included in the solid, resulting in degradation of important physical properties of the nanocarbon.

Korean Patent Publication No. 2011-0065704 titled "Manufacturing method of nanocarbon shaped body and manufacturing method of nanocarbon shaped body, nanocarbon dispersed solution and nanocarbon material using same" discloses a method for manufacturing a nanocarbon shaped body comprising cutting a nanocarbon, mixing the nanocarbon with a dispersant and a solvent and dispersing the nanocarbon using a dispersing apparatus, flocculating the nanocarbon dispersed solution into a nanocarbon sludge by further adding a coagulant, removing a liquid component from the nanocarbon sludge and crushing or pulverizing same into a nanocarbon powder, and shaping the nanocarbon powder and drying same to prepare a nanocarbon shaped body. However, although a metal or a resin is not included in the nanocarbon shaped body, when it is used in a polymer composite, a polymer used as a matrix may react with or be incompatible with the dispersant and the coagulant remaining in the solid, resulting in degradation of important physical properties of the nanocarbon.

Further, developments of a specific additive for improving dispersibility of a carbon nanotube in a melted polymer or uses of a combination of the existing additives are disclosed with regard to the preparation of the carbon nanotube/polymer composite. However, few researches and developments have been made as to how to supply the carbon nanotube to improve dispersibility of the carbon nanotube in a melted polymer.

SUMMARY

The inventors of the present invention have made consistent efforts to solve the above-described problems. As a result, they have confirmed that a polymer composite having superior physical properties can be prepared by using a carbon nanomaterial powder which is mixed with an additive and then pelletized.

The present invention is directed to providing a novel method for preparing a carbon nanomaterial/polymer composite using a carbon nanomaterial powder which is mixed with an additive and then pelletized.

The present invention is also directed to providing a method for preparing a carbon nanomaterial/polymer composite capable of solving the layer separation problem occurring when carbon nanomaterial powder is used together with a polymer pellet to prepare the polymer composite and improving physical properties, wherein a pelletized carbon nanomaterial is mixed with the polymer pellet to prepare the polymer composite.

In an aspect, the present invention provides a method for preparing a carbon nanomaterial/polymer composite, including:
  preparing a mixture powder by mixing an additive used to prepare a carbon nanomaterial/polymer composite with a carbon nanomaterial powder;
  forming the mixture powder into a pellet; and
  preparing the composite by mixing the pellet with a polymer pellet.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1A:
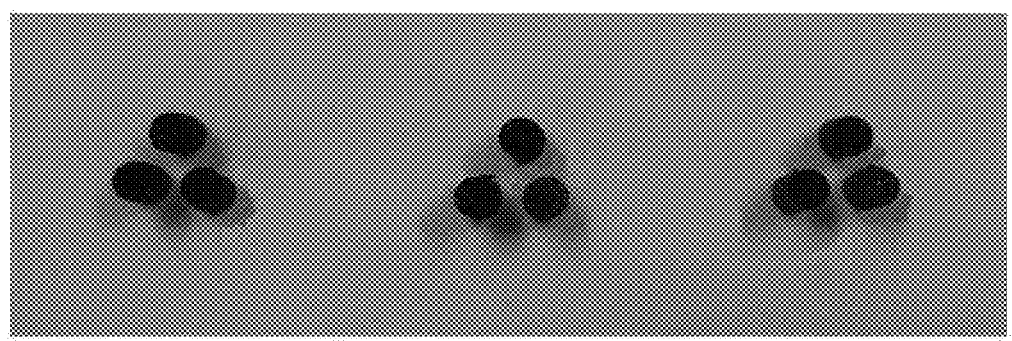
FIG. 1a and FIG. 1b are enlarged photographs of pellets prepared in Example 1 according to the present invention from a mixture powder of a carbon nanomaterial powder and an additive.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the present invention, an additive used to prepare a carbon nanomaterial/polymer composite is mixed with a carbon nanomaterial powder and then pelletized, and the resulting pellet is mixed with a polymer pellet according to a commonly employed method to prepare the composite.

Specifically, a method according to the present invention may comprise: preparing a mixture powder by mixing an additive used to prepare a carbon nanomaterial/polymer composite with a carbon nanomaterial powder; forming the mixture powder into a pellet; and preparing the composite by mixing the pellet with a polymer pellet.

Specifically, in the step of preparing the mixture powder by mixing the additive used to prepare a carbon nanomaterial/polymer composite with the carbon nanomaterial powder, 1-100 parts by weight, more specifically, 10-60 parts by weight, of the additive may be mixed with 100 parts by weight of the carbon nanomaterial powder. When the amount of the additive is too small, compatibility with a polymer material may be poor. In contrast, when the additive is used in too large an amount, physical properties may be poor.

The carbon nanomaterial used in the present invention may be one or more selected from carbon nanotube, carbon nanofiber, graphene and graphite nanoplate. Specifically, carbon nanotube powder may be used.

The carbon nanomaterial powder may have an apparent density of 0.01-0.20 g/mL. When the apparent density is too high, a pellet may not be formed after mixing with the additive. In contrast, when it is too low, the carbon nanomaterial powder may not be mixed uniformly with the additive.

The additive used in the present invention may be one commonly used as a dispersion aid in powder form for polymer compounding and may be selected from low-molecular-weight polyolefin, metal soap, paraffin wax, fatty acid amide, fatty acid ester, polysiloxane resin and Teflon wax.

In the step of preparing the mixture powder by mixing the carbon nanomaterial powder with the additive, it is not necessary to use any other additive such as metal, resin, dispersant, etc. added to solidify a carbon nanomaterial powder in the existing art. Since only the above-described additive indispensable for mixing with the polymer material is used, degradation of physical properties of the polymer composite owing to remaining additives can be avoided.

The carbon nanomaterial powder and the additive in powder form may be mixed uniformly using a commonly employed mixer (e.g., Henschel mixer, tumbler mixer, etc.). As a result, a mixture powder in which the additive is uniformly mixed with carbon nanomaterial powder can be obtained.

Specifically, in the step of forming the mixture powder into a pellet, the mixture powder may be formed into the pellet using a rotary tablet press.

The rotary tablet press used in the present invention may be a tablet press commonly used to prepare a tablet of drug, food, etc.

During the pelletizing, a pressure of specifically 100-700 $kg/cm^2$, more specifically 300-500 $kg/cm^2$ may be applied to the mixture powder. When the pressure is too low, the pellet may be brittle. In contrast, when the pressure is too high, the pelletizing is achieved easily but a polymer composite prepared using the carbon nanomaterial pellet may have poor physical properties.

During the pelletizing, the rotary tablet press is operated with an adequately selected punch size and turntable rotation speed to form a pellet having specific size and apparent density. The prepared pellet may have a cylindrical shape as shown in FIG. 1a (top views), FIG. 1b (perspective views) and FIG. 2. Specifically, the pellet may have a diameter of 2-6 mm, a thickness of 1-6 mm and an apparent density of 0.05-0.60 g/mL, more specifically a diameter of 2-6 mm, a thickness of 2-5 mm and an apparent density of 0.1-0.5 g/mL. When the diameter is too large, layer separation may occur owing to the size difference of the carbon nanomaterial pellet and the polymer pellet. In contrast, when the diameter is too small, productivity of the pellet preparation using the rotary tablet press may be low and layer separation may occur. When the thickness is too large, layer separation may occur owing to the size difference of the carbon nanomaterial pellet and the polymer pellet. In contrast, when the thickness is too small, it may not be easy to form the pellet and the pellet may be brittle. The apparent density affects the physical properties of the polymer composite prepared using the pellet and packaging and transportation of the pellet. When the apparent density is too high, the polymer composite prepared therefrom may have poor physical properties. In contrast, when the apparent density is too low, the effect of saving the cost of packaging and transportation is not significant. And, when the carbon nanomaterial powder used to prepare the pellet has an angle of repose of 10-70°, it may be easier to form the pellet using the rotary tablet press.

For preparation of the pellet according to the present invention, the rotary tablet press may be operated with a punch size of specifically 1-8 mm, more specifically 2-6 mm, and a turntable rotation speed of 10-60 rpm, specifically 20-50 rpm, in order to achieve good productivity and desired properties, i.e. diameter, thickness, apparent density, etc. of the pellet.

The pellet prepared from the mixture of the carbon nanomaterial and the additive according to the present invention may have a diameter of 2-6 mm, a thickness of 1-6 mm and an apparent density of 0.05-0.60 g/mL. Specifically, the carbon nanomaterial powder used for the pelletizing may have an angle of repose of 10-70°. When the angle of repose is in the above range, the pelletizing using the rotary tablet press may be performed easily.

Figure 1B:
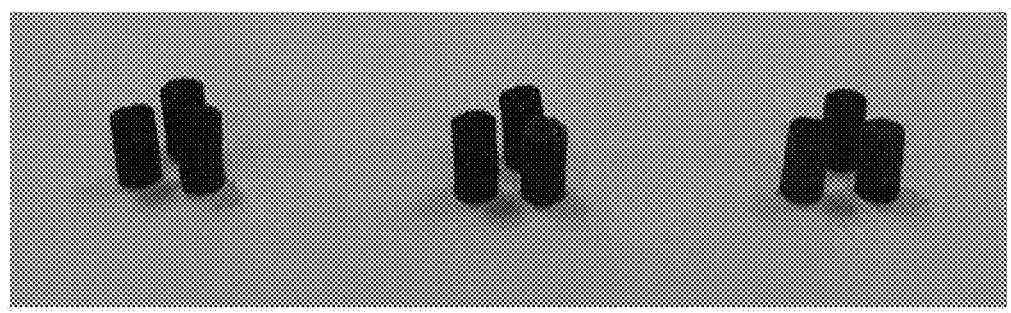
Figure 2:
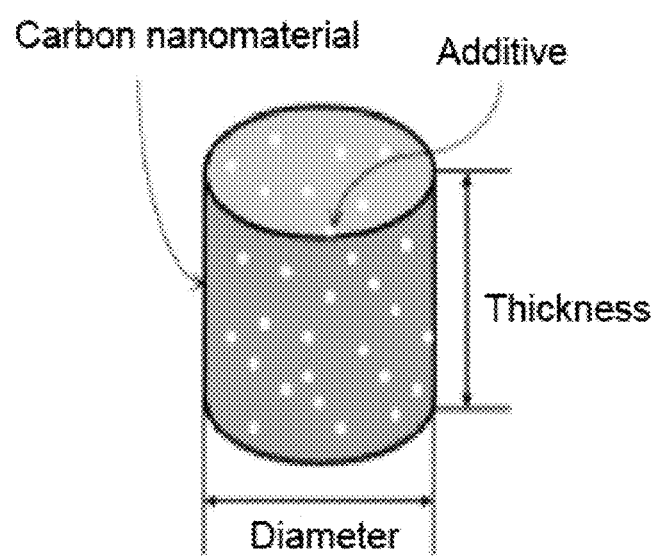
FIG. 2 schematically illustrates a pellet prepared from a mixture powder of a carbon nanomaterial powder and an additive according to the present invention.

The pellet may be prepared into spherical, oval, cylindroid, triangular, square or hexagonal prismatic, or tetrahedral shape, in addition to the cylindrical shape shown in FIGS. 1a and 1b.

The pellet comprising the carbon nanomaterial is mixed with a polymer pellet to prepare a composite.

The polymer material may be one or more selected from polycarbonate, polyethylene terephthalate, amorphous polyethylene terephthalate, glycol-modified polyethylene terephthalate, cyclohexane-modified polyethylene terephthalate, polybutylene terephthalate, polyphenylene oxide, modified polyphenylene oxide, polyphenylene ether, polyether ketone, polyether ketone ketone, polyethylene, polypropylene, polyacryl, polymethyl methacrylate, polysulfone, polyphenylene sulfide, polyethersulfone, sulfonated polybutylene terephthalate, polyetherimide, polyamide, polyamideimide, polyetheramide, polyacetal, acrylonitrile-butadiene-styrene, polystyrene, polyvinyl chloride, polyvinyl fluoride, polychlorotrifluoroethylene, polyurethane, ethylene propylene rubber, ethylene propylene diene monomer, polylactic acid, liquid crystal polymer, polycarbonate/acrylonitrile-butadiene-styrene, polycarbonate/cyclohexane-modified polyethylene terephthalate, acrylonitrile-butadiene-styrene/polyamide, polybutylene terephthalate/polyethylene terephthalate, polybutylene terephthalate/liquid crystal polymer, polysulfone/modified polyphenylene oxide, polypropylene/polyamide and polycarbonate/polylactic acid, as a thermoplastic resin.

For the preparation of the composite by mixing the polymer material with the pellet comprising the carbon nanomaterial, an extruder, kneader, etc. commonly used for preparation of composites may be used. In this case, the pellet prepared from the mixture powder may be mixed only with the polymer material pellet to prepare the composite or an additional additive may be added to the mixture powder.

In accordance with the present invention, the problem of degradation of physical properties owing to the metal, resin or dispersant added for solidification of the carbon nanomaterial powder can be solved. In addition, dust problem owing to the low apparent density of the carbon nanomaterial and health problem occurring therefrom can be solved.

Also, since the carbon nanomaterial powder is used in pellet form, layer separation problem occurring when the carbon nanomaterial in powder form is supplied together with the polymer pellet to an extruder owing to the large density difference of the carbon nanomaterial powder and the polymer pellet can be avoided.

Especially, if the carbon nanomaterial/polymer composite is prepared according to the present invention, the additive acts directly on the carbon nanomaterial powder since the additive is adjacent to the carbon nanomaterial powder. Thus, a carbon nanomaterial/polymer composite having better physical properties can be prepared with the same amount of the additive as compared to when the carbon nanomaterial and the additive are used in powder form.

Accordingly, the carbon nanomaterial/polymer composite prepared according to the present invention is free from the powder dust problem, unlike when the carbon nanomaterial in powder form is mixed with the polymer material as in the existing art, and the health problem occurring therefrom. Furthermore, a carbon nanomaterial/polymer composite having superior physical properties can be obtained with the same amount of the additive.

EXAMPLES

The present invention will be described in more detail through examples. The following examples are for illustrative purposes only and it will be apparent to those skilled in the art not that the scope of this invention is not limited by the examples.

Preparation Example 1

Preparation of Pellet from Mixture Powder of Carbon Nanotube:Additive=5:1

A carbon nanotube powder having an apparent density of 0.042 g/mL was mixed well with a low-molecular-weight polyolefin (LC 104N, Lion Chemtech) as an additive used for preparation of a polymer composite at a weight ratio of 5:1 and supplied to a hopper of a rotary tablet press. After setting to a pellet thickness of 6 mm using a punch 10 mm in diameter, the rotary tablet press was operated at a turntable rotation speed of 20 rpm to prepare a pellet comprising the carbon nanotube powder and the additive mixture powder, having a diameter of 10 mm and a thickness of 6 mm. The prepared mixture powder pellet had an apparent density of 0.102 g/mL.

Preparation Example 2

Preparation of Pellet from Mixture Powder of Carbon Nanotube:Additive=5:1

A carbon nanotube powder having an apparent density of 0.042 g/mL was mixed well with a low-molecular-weight polyolefin (LC 104N, Lion Chemtech) as an additive used for preparation of a polymer composite at a weight ratio of 5:1 and supplied to a hopper of a rotary tablet press. After setting to a pellet thickness of 4.5 mm using a punch 10 mm in diameter, the rotary tablet press was operated at a turntable rotation speed of 20 rpm to prepare a pellet comprising the carbon nanotube powder and the additive mixture powder, having a diameter of 10 mm and a thickness of 4.5 mm. The prepared mixture powder pellet had an apparent density of 0.145 g/mL.

Preparation Example 3

Preparation of Pellet from Mixture Powder of Carbon Nanotube:Additive=3:1

A carbon nanotube powder having an apparent density of 0.042 g/mL was mixed well with a low-molecular-weight polyolefin (LC 104N, Lion Chemtech) as an additive used for preparation of a polymer composite at a weight ratio of 3:1 and supplied to a hopper of a rotary tablet press. After setting to a pellet thickness of 4.5 mm using a punch 10 mm in diameter, the rotary tablet press was operated at a turntable rotation speed of 20 rpm to prepare a pellet comprising the carbon nanotube powder and the additive mixture powder, having a diameter of 10 mm and a thickness of 4.5 mm. The prepared mixture powder pellet had an apparent density of 0.153 g/mL.

Example 1

Preparation of Polymer Composite (1) Preparation of Masterbatch

The mixture powder pellet prepared in Preparation Example 1 and SAN (molecular weight 140,000, Kumho Petrochemical) (The content of the carbon nanotube was 15 wt %) were blended in a twin-screw Banbury mixer or a kneader for 10-40 minutes to prepare a carbon nanotube/SAN masterbatch in pellet form.

(2) Preparation of Carbon Nanotube/Polymer Composite

The prepared carbon nanotube/SAN masterbatch and a PC/ABS compound (HAC-8265, Kumho Petrochemical) (The content of the carbon nanotube was 3 wt %) were sufficiently mixed using a small tumbler mixer. After extruding using a twin-screw extruder (Φ=30 mm, L/D=36) at 240-290° C., followed by cooling and solidification, the resulting pellet was dried for 4 hours in a convection oven maintained at 80° C. Thereafter, a 100 mm×50 mm×2 mm test sample was prepared by injection molding at 250-300° C. using a 160-ton injection molding machine with the mold temperature kept at 65° C. Surface resistance of the test sample was measured using the TRUSTAT-Worksurface tester.

Example 2

Preparation of Polymer Composite

A test sample was prepared in the same manner as in Example 1 except for using the mixture powder prepared in Preparation Example 2.

Example 3

Preparation of Polymer Composite

A test sample was prepared in the same manner as in Example 1 except for using the mixture powder prepared in Preparation Example 3.

Comparative Example 1

Preparation of Polymer Composite (1) Preparation of Masterbatch

A carbon nanotube powder having an apparent density of 0.042 g/mL, a low-molecular-weight polyolefin (LC 104N, Lion Chemtech) as an additive used for preparation of a polymer composite and SAN (molecular weight 140,000, Kumho Petrochemical) (The content of the carbon nanotube was 15 wt % and that of the additive was 3 wt %) were blended in a twin-screw Banbury mixer or a kneader for 10-40 minutes to prepare a carbon nanotube/SAN masterbatch in pellet form.

(2) Preparation of Carbon Nanotube/Polymer Composite

The prepared carbon nanotube/SAN masterbatch and a PC/ABS compound (HAC-8265, Kumho Petrochemical) (The content of the carbon nanotube was 3 wt %) were sufficiently mixed using a small tumbler mixer. After extruding using a twin-screw extruder (Φ=30 mm, L/D=36) at 240-290° C., followed by cooling and solidification, the resulting pellet was dried for 4 hours in a convection oven maintained at 80° C. Thereafter, a 100 mm×50 mm×2 mm test sample was prepared by injection molding at 250-300° C. using a 160-ton injection molding machine with the mold temperature kept at 65° C. Surface resistance of the test sample was measured using the TRUSTAT-Worksurface tester.

Comparative Example 2

Preparation of Polymer Composite

A test sample was prepared in the same manner as in Comparative Example 1 except for adjusting the content of the additive to 5 wt % when preparing the masterbatch.

Test Example 1

Pellet size and physical properties of the mixture powder pellets comprising the carbon nanotube powder and the additive prepared in Preparation Examples 1-3 (Table 1) and those of the polymer composites prepared in Examples 1-3 and Comparative Example 1 (Table 2) were measured to confirm the effect of the present invention.

Surface resistance was measured by a two-terminal method using the TRUSTAT-Worksurface tester.

TABLE 1

|  | Preparation Examples | | |
| --- | --- | --- | --- |
|  | 1 | 2 | 3 |
| Carbon nanotube powder: additive | 5:1 | 5:1 | 3:1 |
| Pellet diameter (mm) | 10 | 10 | 10 |
| Pellet thickness (mm) | 6 | 4.5 | 4.5 |
| Apparent density (g/mL) | 0.102 | 0.145 | 0.153 |

TABLE 2

|  | Examples | | | Comparative Examples | |
| --- | --- | --- | --- | --- | --- |
|  | 1 | 2 | 3 | 1 | 2 |
| Content of carbon nanotube (wt %) | 3 | 3 | 3 | 3 | 3 |
| Content of additive (wt %) | 0.6 | 0.6 | 1 | 0.6 | 1 |
| Content of thermoplastic resin (wt %) | 96.4 | 96.4 | 96 | 96.4 | 96 |
| Surface resistance (Log Ω/□) | 4.20 | 4.18 | 4.08 | 4.29 | 4.18 |
| Carbon nanotube powder dust | ⊚ | ⊚ | ⊚ | Δ | Δ |

(Note)
⊚: no dust, ○: slight dust, Δ: dust, X: severe dust

As seen from Table 2, when the carbon nanotube/polymer composites were prepared from the masterbatches according to the present invention (Examples 1-3), the carbon nanotube powder dust problem could be solved and improved electrical conductivity could be achieved with the same amount of the additive as compared to when the carbon nanotube and the additive were used in powder form (Comparative Examples 1-2).

Preparation Example 4

Preparation of Pellet from Mixture Powder of Carbon Nanotube:Additive=2:1

A carbon nanotube powder having an apparent density of 0.059 g/mL was mixed well with a low-molecular-weight polyolefin (LC 104N, Lion Chemtech) as an additive used for preparation of a polymer composite at a weight ratio of 2:1 and supplied to a hopper of a rotary tablet press. After setting to a pellet thickness of 7 mm using a punch 4 mm in diameter, the rotary tablet press was operated at a turntable rotation speed of 20 rpm to prepare a pellet comprising the carbon nanotube powder and the additive mixture powder, having a diameter of 4 mm and a thickness of 7 mm.

Preparation Example 5

Preparation of Pellet from Mixture Powder of Carbon Nanotube:Additive=3:1

A carbon nanotube powder having an apparent density of 0.059 g/mL was mixed well with a low-molecular-weight polyolefin (LC 104N, Lion Chemtech) as an additive used for preparation of a polymer composite at a weight ratio of 3:1 and supplied to a hopper of a rotary tablet press. After setting to a pellet thickness of 7 mm using a punch 4 mm in diameter, the rotary tablet press was operated at a turntable rotation speed of 20 rpm to prepare a pellet comprising the carbon nanotube powder and the additive mixture powder, having a diameter of 4 mm and a thickness of 7 mm.

Example 4

Preparation of Polymer Composite

The mixture powder pellet prepared in Preparation Example 4 and a PC/ABS compound (HAC-8265, Kumho Petrochemical) (The content of the carbon nanotube was 2 wt %) were sufficiently mixed using a small tumbler mixer. After extruding using a twin-screw extruder ($\Phi=30$ mm, L/D=36) at 240-290° C., followed by cooling and solidification, the resulting pellet was dried for 4 hours in a convection oven maintained at 80° C. Thereafter, a 100 mm×50 mm×2 mm test sample was prepared by injection molding at 250-300° C. using a 160-ton injection molding machine with the mold temperature kept at 65° C. Surface resistance of the test sample was measured using the TRUSTAT-Worksurface tester.

Example 5

Preparation of Polymer Composite

A test sample was prepared in the same manner as in Example 4 except for adjusting the content of the carbon nanotube to 3 wt % using the mixture powder pellet prepared in Preparation Example 5.

Comparative Example 3

Preparation of Polymer Composite

A carbon nanotube powder having an apparent density of 0.059 g/mL, a low-molecular-weight polyolefin (LC 104N, Lion Chemtech) as an additive and a PC/ABS compound (HAC-8265, Kumho Petrochemical) (The content of the carbon nanotube was 2 wt % and that of the additive was 1 wt %) were sufficiently mixed using a small tumbler mixer. After extruding using a twin-screw extruder ($\Phi=30$ mm, L/D=36) at 240-290° C., followed by cooling and solidification, the resulting pellet was dried for 4 hours in a convection oven maintained at 80° C. Thereafter, a 100 mm×50 mm×2 mm test sample was prepared by injection molding at 250-300° C. using a 160-ton injection molding machine with the mold temperature kept at 65° C. Surface resistance of the test sample was measured using the TRUSTAT-Worksurface tester.

Comparative Example 4

Preparation of Polymer Composite

A test sample was prepared in the same manner as in Comparative Example 3 except for adjusting the content of the carbon nanotube to 3 wt %.

Test Example 2

Physical properties of the polymer composites prepared in Examples 4-5 and Comparative Examples 3-4 were measured to confirm the effect of the present invention. The result is given in Table 3.

Surface resistance was measured by a two-terminal method using the TRUSTAT-Worksurface tester.

TABLE 3

|  | Examples | | Comparative Examples | |
| --- | --- | --- | --- | --- |
|  | 4 | 5 | 3 | 4 |
| Content of carbon nanotube (wt %) | 2 | 3 | 2 | 3 |
| Content of additive (wt %) | 1 | 1 | 1 | 1 |
| Content of thermoplastic resin (wt %) | 97 | 96 | 97 | 96 |
| Surface resistance (Log $\Omega/\square$) | 6.14 | 4.21 | 6.61 | 4.33 |
| Carbon nanotube powder dust | ⊚ | ⊚ | X | X |
| Layer separation of carbon nanotube powder | ⊚ | ⊚ | X | X |

(Note)
Carbon nanotube powder dust: ⊚: no dust, ○: slight dust, Δ: dust X: severe dust
Layer separation of carbon nanotube powder: ⊚: no separation, ○: slight separation, Δ: separation, X: severe separation As seen from Table 3, when the carbon nanotube/polymer composites were prepared according to the present invention (Examples 4-5), the carbon nanotube powder dust problem and the layer separation problem owing to the large density difference of the carbon nanomaterial powder and the polymer pellet could be solved and improved electrical conductivity could be achieved with the same amount of the additive as compared to when the carbon nanotube and the additive were used in powder form (Comparative Examples 3-4).

Preparation Example 6

Preparation of Pellet from Mixture Powder of Carbon Nanotube:Additive=2:1

A carbon nanotube powder having an apparent density of 0.059 g/mL was mixed well with Teflon wax as an additive used for preparation of a polymer composite at a weight ratio of 2:1 and supplied to a hopper of a rotary tablet press. After setting to a pellet thickness of 7 mm using a punch 4 mm in diameter, the rotary tablet press was operated at a turntable rotation speed of 20 rpm to prepare a pellet comprising the carbon nanotube powder and the additive mixture powder, having a diameter of 4 mm and a thickness of 7 mm.

Preparation Example 7

Preparation of Pellet from Mixture Powder of Carbon Nanotube:Additive=2:1

A carbon nanotube powder having an apparent density of 0.059 g/mL was mixed well with the fatty acid amide ethylene bis(stearamide) as an additive used for preparation of a polymer composite at a weight ratio of 2:1 and supplied to a hopper of a rotary tablet press. After setting to a pellet thickness of 7 mm using a punch 4 mm in diameter, the rotary tablet press was operated at a turntable rotation speed of 20 rpm to prepare a pellet comprising the carbon nanotube powder and the additive mixture powder, having a diameter of 4 mm and a thickness of 7 mm.

Example 6

Preparation of Polymer Composite

The mixture powder pellet prepared in Preparation Example 6 and a PC/ABS compound (HAC-8265, Kumho Petrochemical) (The content of the carbon nanotube was 1 wt % and that of the additive was 0.5 wt %) were blended in a Haake mixer for to 10 minutes at a twin-screw speed of 50 rpm at 250° C. Thus obtained composite lump was pressed with a hot press at 250° C. for 10 minutes at a pressure of 7.5 tons/cm$^2$ to prepare a 75 mm×55 mm×2 mm test sample. Surface resistance of the test sample was measured using the TRUSTAT-Worksurface tester.

Example 7

Preparation of Polymer Composite

A test sample was prepared in the same manner as in Example 6 except for using the mixture powder pellet prepared in Preparation Example 7.

Comparative Preparation Example 1

Preparation of Carbon Nanotube Pellet Having Diameter of 4 Mm and Thickness of 5 Mm A carbon nanotube powder having an apparent density of 0.059 g/mL was supplied to a hopper of a rotary tablet press. After setting to a pellet thickness of 5 mm using a punch 4 mm in diameter, the rotary tablet press was operated at a turntable rotation speed of 20 rpm to prepare a pellet comprising the carbon nanotube powder and the additive mixture powder, having a diameter of 4 mm and a thickness of 5 mm. The prepared carbon nanotube pellet had an apparent density of 0.127 g/mL.

Comparative Example 5

Preparation of Polymer Composite

The mixture powder pellet prepared in Comparative Preparation Example 1, a PC/ABS compound (HAC-8265, Kumho Petrochemical) and Teflon wax as an additive (The content of the carbon nanotube was 1 wt % and that of the additive was 0.5 wt %) were blended in a Haake mixer for 10 minutes at a twin-screw speed of 50 rpm at 250° C. Thus obtained composite lump was pressed with a hot press at 250° C. for 10 minutes at a pressure of 7.5 tons/cm$^2$ to prepare a 75 mm×55 mm×2 mm test sample. Surface resistance of the test sample was measured using the TRUSTAT-Worksurface tester.

Comparative Example 6

Preparation of Polymer Composite

A test sample was prepared in the same manner as in Comparative Example 5 except for using the fatty acid amide ethylene bis(stearamide) as the additive.

Comparative Example 7

Preparation of Polymer Composite

A carbon nanotube powder having an apparent density of 0.059 g/mL, a PC/ABS compound (HAC-8265, Kumho Petrochemical) and Teflon wax as an additive (The content of the carbon nanotube was 1 wt % and that of the additive was 0.5 wt %) were blended in a Haake mixer for 10 minutes at a twin-screw speed of 50 rpm at 250° C. Thus obtained composite lump was pressed with a hot press at 250° C. for 10 minutes at a pressure of 7.5 tons/cm$^2$ to prepare a 75 mm×55 mm×2 mm test sample. Surface resistance of the test sample was measured using the TRUSTAT-Worksurface tester.

Comparative Example 8

Preparation of Polymer Composite

A test sample was prepared in the same manner as in Comparative Example 7 except for using the fatty acid amide ethylene bis(stearamide) as the additive.

Test Example 3

Physical properties of the polymer composites prepared in Examples 6-7 and Comparative Examples 5-8 were measured to confirm the effect of the present invention. The result is given in Table 4.

Surface resistance was measured by a two-terminal method using the TRUSTAT-Worksurface tester.

TABLE 4

| | Examples | | Comparative Examples | | | |
| --- | --- | --- | --- | --- | --- | --- |
| | 6 | 7 | 5 | 6 | 7 | 8 |
| Content of carbon nanotube (wt %) | 1 | 1 | 1 | 1 | 1 | 1 |
| Content of additive (wt %) | 0.5 | 0.5 | 0.5 | 0.5 | 0.5 | 0.5 |
| Content of thermoplastic resin (wt %) | 98.5 | 98.5 | 98.5 | 98.5 | 98.5 | 98.5 |
| Surface resistance (Log Ω/□) | 3.13 | 3.23 | 3.31 | 3.45 | 3.36 | 3.48 |
| Carbon nanotube powder dust | ⊚ | ⊚ | Δ | Δ | Δ | Δ |

(Note)
⊚: no dust, ○: slight dust, Δ: dust, X: severe dust

As seen from Table 4, when the carbon nanotube/polymer composites were prepared according to the present invention (Examples 6-7), the carbon nanotube powder dust problem could be solved and improved electrical conductivity could be achieved with the same amount of the additive as compared to when the carbon nanotube powder pellet and the additive in powder form were used (Comparative Examples 5-6) or when both the carbon nanotube and the additive were used in powder form (Comparative Examples 7-8).

When the carbon nanomaterial/polymer composite is prepared according to the present invention, the carbon nanomaterial powder dust problem can be solved since the carbon nanomaterial powder is prepared into a pellet after being mixed only with an additive indispensable for preparation of the composite without other additives. Further, since the carbon nanomaterial is mixed with a polymer pellet in pellet form, the layer separation problem can be solved due to superior homogeneity and dispersibility with the polymer pellet.

Another effect provided by the present invention is that the additive used to prepare the carbon nanomaterial/polymer composite acts directly on the carbon nanomaterial powder since it is mixed uniformly with the carbon nanomaterial powder and then pelletized and, thus, is adjacent to the carbon nanomaterial powder. Thus, a carbon nanomaterial/polymer composite having better physical properties can be prepared with the same amount of the additive as compared to when the carbon nanomaterial and the additive are used in powder form.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a carbon nanomaterial/polymer composite, the method comprising:
    preparing a mixture powder by mixing a powder that consists of a dispersion aid with a carbon nanomaterial powder;
    forming the mixture powder into a pellet using a rotary tablet press; and
    preparing the composite by mixing the pellet with a polymer pellet,
    wherein 1-100 parts by weight of the dispersion aid is mixed with 100 parts by weight of the carbon nanomaterial powder,
    wherein the dispersion aid is at least one selected from the group consisting of low-molecular-weight polyolefin, metal soap, paraffin wax, fatty acid amide, fatty acid ester, polysiloxane resin and polytetrafluoroethylene wax, and
    wherein the carbon nanomaterial powder has an apparent density of 0.01-0.20 g/mL and an angle of repose of 10°-70°.

2. The method for preparing the composite according to claim 1, wherein the carbon nanomaterial is one or more selected from carbon nanotube, carbon nanofiber, graphene and graphite nanoplate.

3. The method for preparing the composite according to claim 1, wherein the dispersion aid is selected from low-molecular-weight polyolefin, metal soap, paraffin wax, fatty acid amide, fatty acid ester, polysiloxane resin and polytetrafluoroethylene wax.

4. The method for preparing the composite according to claim 1, wherein the polymer material is one or more selected from polycarbonate, polyethylene terephthalate, amorphous polyethylene terephthalate, glycol-modified polyethylene terephthalate, cyclohexane-modified polyethylene terephthalate, polybutylene terephthalate, polyphenylene oxide, modified polyphenylene oxide, polyphenylene ether, polyether ketone, polyether ketone ketone, polyethylene, polypropylene, polyacryl, polymethyl methacrylate, polysulfone, polyphenylene sulfide, polyethersulfone, sulfonated polybutylene terephthalate, polyetherimide, polyamide, polyamideimide, polyetheramide, polyacetal, acrylonitrile-butadiene-styrene, polystyrene, polyvinyl chloride, polyvinyl fluoride, polychlorotrifluoroethylene, polyurethane, ethylene propylene rubber, ethylene propylene diene monomer, polylactic acid, liquid crystal polymer, polycarbonate/acrylonitrile-butadiene-styrene, polycarbonate/cyclohexane-modified polyethylene terephthalate, acrylonitrile-butadiene-styrene/polyamide, polybutylene terephthalate/polyethylene terephthalate, polybutylene terephthalate/liquid crystal polymer, polysulfone/modified polyphenylene oxide, polypropylene/polyamide and polycarbonate/polylactic acid.

5. A carbon nanomaterial/polymer composite prepared by the method according to claim 1, wherein the pellet prepared from the mixture of the carbon nanomaterial and the dispersion aid has a diameter of 2-6 millimeters (mm), a thickness of 1-6 mm and an apparent density of 0.05-0.60 g/mL.

6. A method for preparing a carbon nanomaterial/polymer composite, comprising:
    preparing a mixture powder by mixing a powder that consists of a dispersion aid with a carbon nanomaterial powder;
    forming the mixture powder into a pellet using a rotary tablet press; and
    preparing the composite by mixing the pellet with a polymer pellet,
    wherein 10-60 parts by weight of the dispersion aid is mixed with 100 parts by weight of the carbon nanomaterial powder,
    wherein the dispersion aid is at least one selected from the group consisting of low-molecular-weight polyolefin, metal soap, paraffin wax, fatty acid amide, fatty acid ester, polysiloxane resin and polytetrafluoroethylene wax, and
    wherein the carbon nanomaterial powder has an apparent density of 0.01-0.20 g/mL and an angle of repose of 10°-70°.

7. The method for preparing the composite according to claim 6, wherein the mixture powder is formed into the pellet using a rotary tablet press with a pressure of 100-700 $kg/cm^2$.

* * * * *